May 30, 1933. V. H. NALINNE 1,911,524
ELASTIC VEHICLE WHEEL
Filed Jan. 31, 1931  4 Sheets-Sheet 2
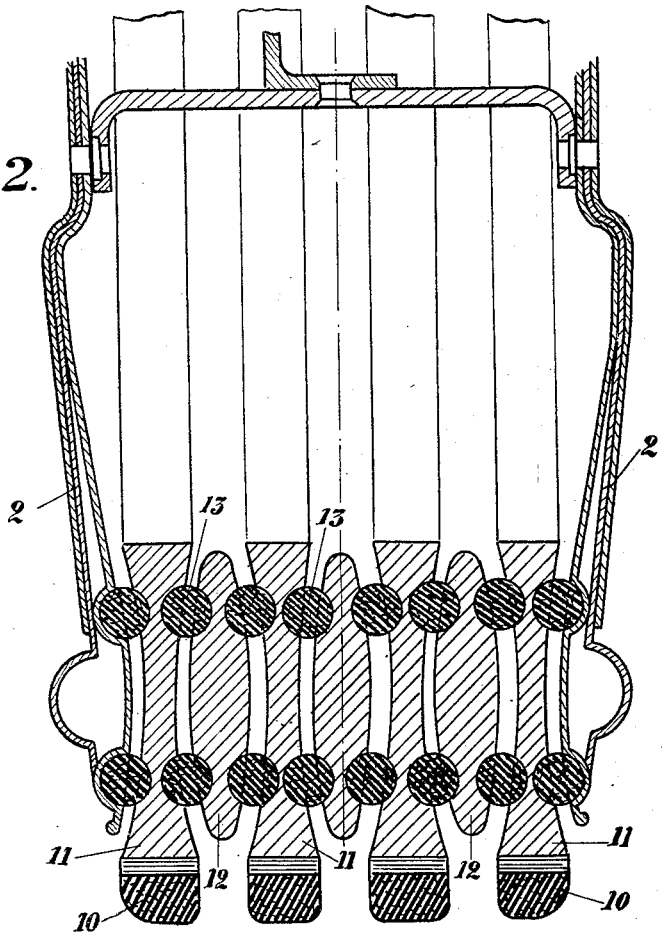
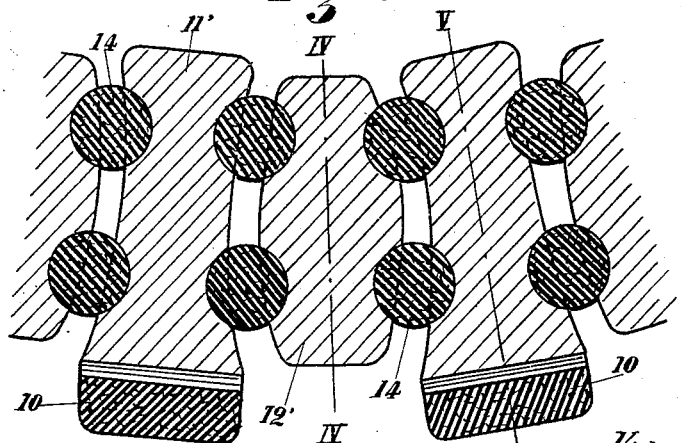
Inventor:
Victor Henri Nalinne
Attorney:

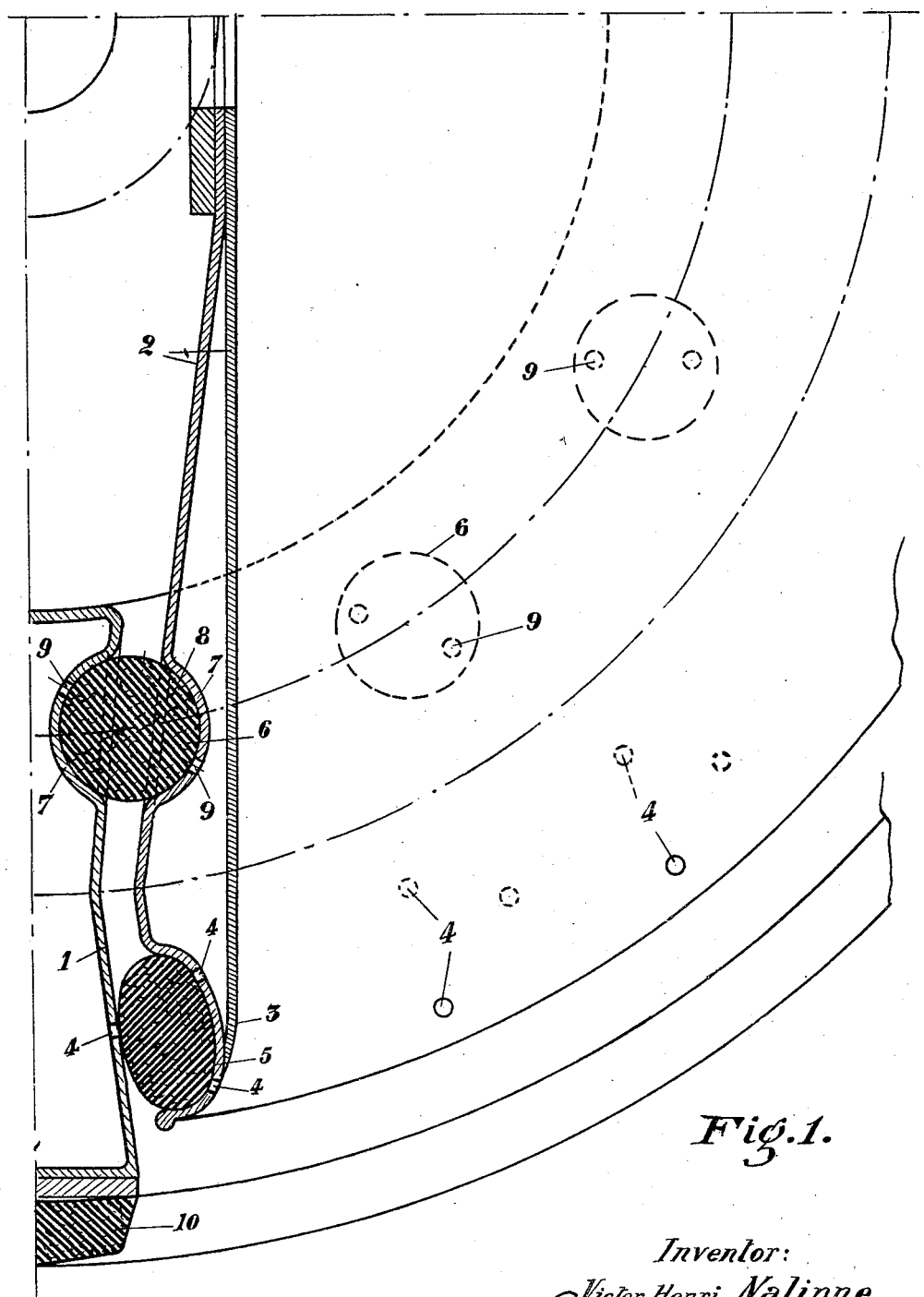

May 30, 1933.  V. H. NALINNE  1,911,524
ELASTIC VEHICLE WHEEL
Filed Jan. 31, 1931  4 Sheets-Sheet 3
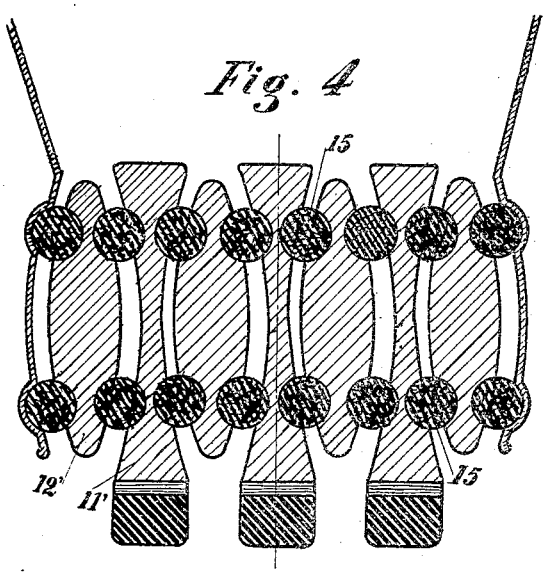
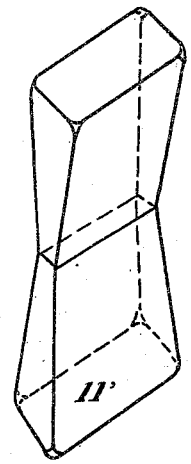
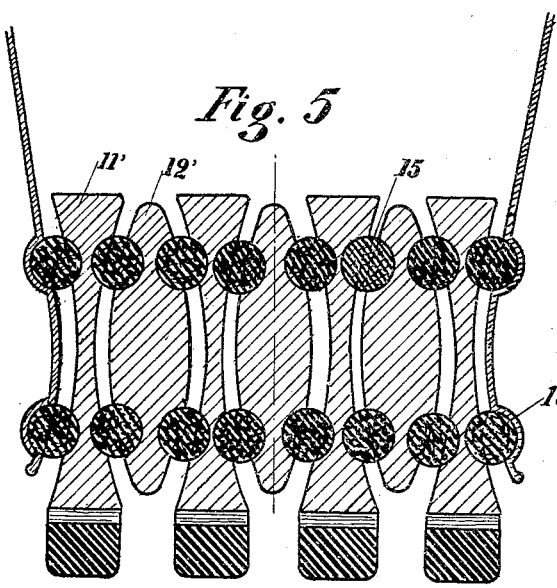
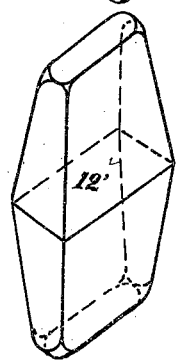
Inventor:
Victor Henri Nalinne
BY  Attorney:

May 30, 1933. V. H. NALINNE 1,911,524
ELASTIC VEHICLE WHEEL
Filed Jan. 31, 1931   4 Sheets-Sheet 4

Inventor
V. H. NALINNE
Attorney

Patented May 30, 1933

1,911,524

UNITED STATES PATENT OFFICE

VICTOR HENRI NALINNE, OF BRUSSELS, BELGIUM

ELASTIC VEHICLE WHEEL

Application filed January 31, 1931, Serial No. 512,667, and in Belgium February 11, 1930.

My present invention relates to elastic vehicle wheels and it has for its object to provide an improved elastic wheel with a removable rim for any kind of vehicles, the essential feature of which resides in the face that it is formed of a movable rim made of bi-trapezoidal shape in cross section and two side discs fast on the hub member of the wheel and surrounding said rim, the elasticity of the wheel and moving around of the rim by said discs being secured by two series of intermediate elastic members, one of which operates by friction and the other by direct engagement, said series of elastic members being arranged symmetrically with relation to a diametrical axis and the cells or housings for the reception of said elastic members being made of any desired section and arranged in any desired position, direction and number.

The movable wheel rim may be made of a single piece or a plurality of pieces rigidly secured on or to each other. It may be formed of symmetrical bi-trapezoidal members, arranged parallel to the plane of the wheel and connected together by means of movable symmetrical likewise bi-trapezoidal rings, but inverted with relation to said members. The connections between said members and rings may be effected by means of elastic members, such as balls, engaging corresponding cells or housings, in the same manner as for the connection of the complete wheel rim to the outer discs.

The division of the wheel rim into sections on planes parallel to the plane of the wheel may also be made in the transverse direction, that is on radial or diametrical planes. Thus I obtain a wheel rim composed of bi-trapezoidal blocks connected together on all their adjacent faces by means of inverted bi-trapezoidal members with other elastic members inserted between them, said wheel rim made of a general bi-trapezoidal shape in cross section being inserted between two side discs serving to move it around as already mentioned.

My invention is illustrated in the accompanying drawings by way of example:

Fig. 1 is a fragmentary side view partly in vertical transverse section of a wheel with rigid rim according to my invention.

Fig. 2 is a fragmentary transverse section of the same wheel but having a rim formed of sections parallel to the plane of the wheel.

Fig. 3 is a fragmentary section on a plane parallel to the plane of the wheel, the wheel rim being formed of blocks.

Fig. 4 is a section on line IV—IV of Fig. 3.

Fig. 5 is a section on line V—V of Fig. 3.

Figs. 6 and 7 are perspective views of the blocks and members shown in Figs. 3 to 5 with the cells therein omitted.

Figure 8:
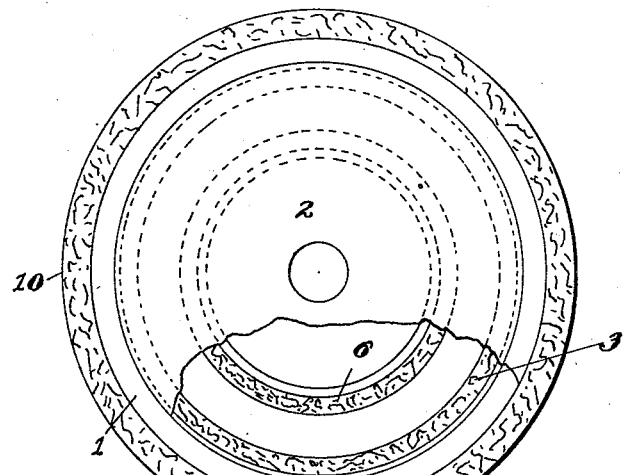
Figure 8 is a view of the modification showing the elastic material as rings.
Figure 9:
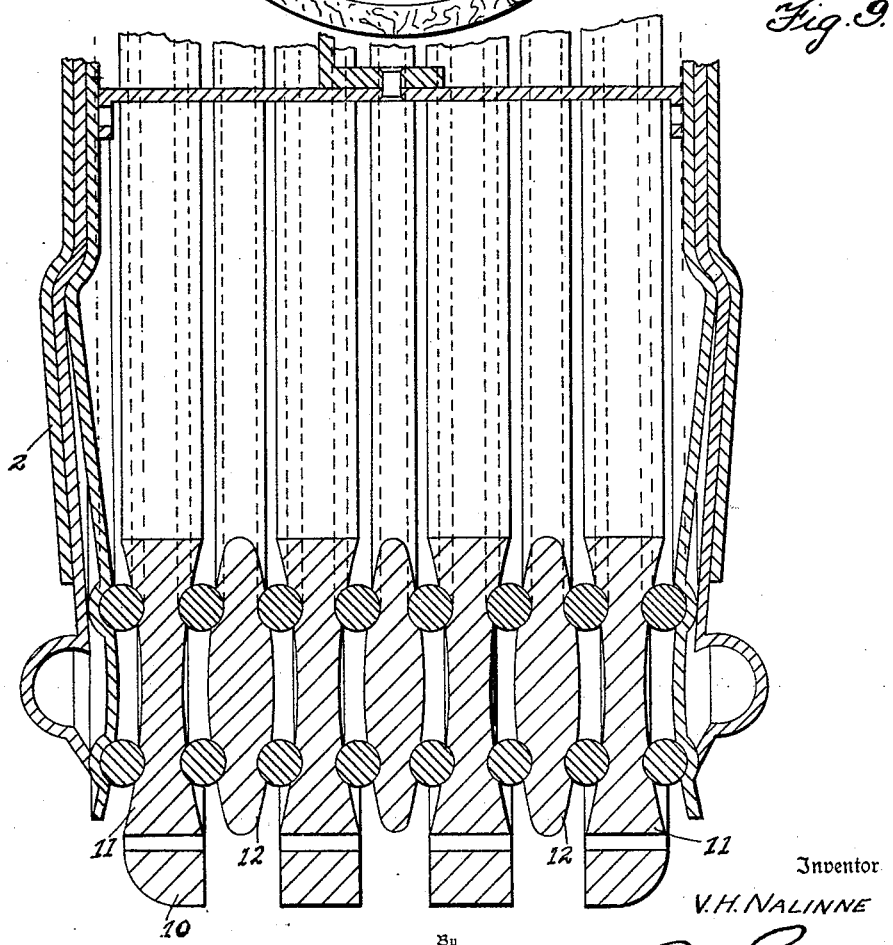
Figure 9 is a broken sectional view of the form shown in Figure 8.

Referring to Fig. 1, the wheel comprises a movable rigid rim 1, the transverse section of which is made of the shape of two equal trapezoids joined by their little bases. Said rim is combined with two discs 2 fast on the hub of the wheel.

The elastic connection between the rim and discs 2 is effected in such a way that said rim will be moved around by said discs through the agency of:

(a) A bead or ring of India rubber or other elastic material 3 which is enabled to expand itself in circular cells or housings 4 provided in the rim as well as in the receiving groove 5 in the discs 2.

(b) Bodies of India rubber or other elastic material 6 engaging corresponding cells or housings 7 in the movable rim and and side discs, said bodies securing a direct engagement between the rim and discs. The expansion of the elastic material is secured by channels 8 is provided in said bodies, and in the case of excessive shocks holes 9 will be provided in the cells or housings for increasing the expansion spaces.

In order to secure the balance of the reactions the section of the movable rim and the corresponding sections of the side discs are symmetrical with relation to an axis passing through the centre of the wheel.

Secured to the rim 1 is any desired pneumatic, solid or metallic tyre 10.

The wheel rim described is made of a single piece or a plurality of pieces or sections rigidly connected together.

In the example shown in Fig. 2 the rim is divided into sections on planes parallel to the plane of the wheel. Said sections 11 are also of a symmetrical double trapezoidal shape in cross section and connected together by means of movable similarly symmetrical bi-trapezoidal rings 12, which are opposite double taper with relation to the sections 11. The sections 11 and movable rings 12 are connected together by means of elastic members 13 such as balls or rings housed within corresponding cells in the sections 11 and rings 12. Said members 13 operate under the same circumstances as the corresponding end members connecting the complete wheel rim to the lateral discs 2 as already described with reference to Fig. 1.

The wheel rim may be constituted by sections determined by dividing it on radial planes and preferably this method of division will be combined with that of Fig. 2. A wheel rim of this kind is shown in detail in Figs. 3 to 5. It is formed of bi-trapezoidal blocks which are symmetrical in both vertical sections for the intermediate rings 12' as well as for the sections of the wheel rim proper. In other words in order to secure the characteristic feature of the wheel consisting in distributing the stresses in its entire construction, the blocks 11' are symmetrically bi-trapezoidal in either direction, as well as the intermediate blocks 12', the latter being however inverted. In order to enable each block to be moved with relation to the other, they are arranged in staggered relation as shown in Figs. 4 and 5, and connected together in either direction (on the plane of the wheel and the radial plane) by means of elastic balls 14 and 15 engaging corresponding cells or housings. Thus each block will be held between eight balls.

Having now fully described my said invention, what I claim and desire to secure by Letters Patent, is:

1. An elastic vehicle wheel comprising in combination a removable rim made of symmetrical bi-trapezoidal shape in cross section, a tyre on said rim, two discs secured to the wheel hub and covering the faces of the rim, and elastic bodies inserted between said discs and rim and certain of which operate by friction whilst others operate by interfitting engagement for elastically causing the rim to be moved around with the discs.

2. An elastic vehicle wheel comprising in combination a removable rim made of symmetrical bi-trapezoidal shape in cross section; a tyre on said rim, two discs secured to the wheel hub and covering the faces of the rim, and elastic bodies inserted between said discs and rim, certain of said bodies being made of spherical shape and housed in correspondingly shaped cells defined by oppositely opening cavities in said discs and corresponding faces of the rim, and the other bodies being made of the shape of beads or rings housed in circular grooves in the discs and bearing on the opposite faces of the rim.

3. An elastic vehicle wheel comprising in combination a removable rim made of symmetrical bi-trapezoidal shape in cross section, a tyre on said rim, two discs secured to the wheel hub and covering the faces of the rim, and elastic bodies inserted between said discs and rim, certain of said bodies being made of spherical shape and housed in correspondingly shaped cells provided defined by oppositely opening cavities in said discs and corresponding faces of the rim for causing the rim to be moved around by the discs, and the other bodies being made of the shape of beads or rings housed in circular grooves in the discs and bearing on the opposite faces of the rim, said cells and grooves being provided with holes for the expansion of the elastic material.

4. An elastic vehicle wheel comprising a removable rim made of symmetrical bi-trapezoidal shape in cross section, formed of sections parallel to the plane of the wheel, each section being itself made of symmetrical bi-trapezoidal shape and two successive sections being separated by a ring of symmetrical bi-trapezoidal cross section opposite double taper with relation to that of the rim sections, the connection of the various sections and rings being effected by means of elastic members housed in corresponding cells defined by oppositely opening cavities in the opposite faces of the various sections and rings, a tyre on said rim, two discs secured to the wheel hub and covering the faces of the rim, and elastic bodies inserted between said discs and rim, certain of said bodies operating by friction and the other bodies operating by direct engagement for elastically causing the rim to be moved around by the discs.

5. An elastic vehicle wheel comprising in combination a removable rim made of symmetrical bi-trapezoidal shape in cross section, formed of sections parallel to the plane of the wheel, each section being itself made of symmetrical bi-trapezoidal shape and two successive sections being separated by a ring of symmetrical bi-trapezoidal section opposite double taper with relation to that of the rim sections, the connection of the various sections and rings being effected by means of elastic members housed in corresponding cells defined by oppositely opening cavities in the opposite faces of the various sections and rings, a tyre on said rim, two discs secured to the wheel hub and covering the faces of the rim, and elastic bodies inserted between said discs and rim, certain of said bodies being made of spherical shape and housed in corresponding shaped cells defined by oppositely opening cavities in the discs and corresponding faces of the rim for causing the rim to be moved around with the discs, and the other bodies being made of the shape of beads or rings housed in circular grooves in the discs and bearing against the opposite faces of the rim.

6. For vehicle wheels an elastic composite rim made of a symmetrical bi-trapezoidal shape in cross section, said rim being constituted by means of blocks made of symmetrical bi-trapezoidal shape in the radial section as well as in the section on a plane parallel to the plane of the wheel, and separated from each other in the radial plane as well as in the plane parallel to the wheel by opposite double taper symmetrical bi-trapezoidal bodies, with the insertion between the adjacent blocks of elastic members housed in corresponding cells defined by oppositely opening cavities in the opposite faces of the two adjacent blocks.

7. For vehicle wheels an elastic composite rim made of symmetrical bi-trapezoidal shape in cross section, said rim being constituted by means of blocks made of symmetrical bi-trapezoidal shape in the radial section as well as in the section on a plane parallel to the plane of the wheel, and separated from each other in the radial plane as well as in the plane parallel to the wheel by opposite double taper symmetrical bi-trapezoidal bodies with the insertion between the adjacent blocks of elastic members housed in corresponding cells defined by oppositely opening cavities in the opposite faces of the two adjacent blocks, the bi-trapezoidal blocks and inverted bi-trapezoidal members being arranged in staggered relation.

8. An elastic vehicle wheel comprising in combination an elastic composite rim made of symmetrical bi-trapezoidal section, said rim being formed of blocks made of symmetrical bi-trapezoidal shape in the radial section as well as in the section on a plane parallel to the plane of the wheel and separated from each other in the radial plane as well as in the plane parallel to the wheel by opposite double taper bodies of symmetrical bi-trapezoidal cross section, with the insertion between the adjacent blocks of elastic members housed in corresponding cells defined by oppositely opening cavities in the opposite faces of the two adjacent blocks, the said rim being surrounded on both sides by discs secured to the hub of the wheel, the rim being caused to move around with said discs by elastic bodies inserted between said discs and rim and certain of which operate by friction and others by direct engagement.

9. An elastic vehicle wheel comprising in combination an elastic composite rim made of symmetrical bi-trapezoidal shape in cross section, said rim being formed of blocks made of symmetrical bi-trapezoidal shape in the radial section as well as in the section on a plane parallel to the plane of the wheel and separated from each other in the radial plane as well as in the plane parallel to the wheel by opposite double taper bodies of symmerical bi-trapezoidal cross section, with the insertion between the adjacent blocks of elastic members housed in corresponding cells defined by oppositely opening cavities in the opposite faces of the two adjacent blocks, said rim being surrounded on both sides by two discs secured to the hub of the wheel, said rim being elastically caused to move around with the discs by elastic bodies inserted between said discs and rim, certain of said elastic bodies being made of spherical shape and housed in correspondingly shaped cells defined by oppositely opening cavities in the discs and opposite faces of the rim in order to cause the rim to move around with the discs, and the other bodies being made of the shape of beads or rings housed in circular grooves in the discs and bearing against the opposite faces of the rim.

10. An elastic vehicle wheel, comprising in combination a removable rim made of a symmetrical bi-trapezoidal shape in cross section, two discs secured to the hub of the wheel and covering the faces of the rim, and elastic bodies inserted between said discs and rim, certain of said bodies operating by friction and others by direct engagement, the latter having internal channels for their expansion.

VICTOR HENRI NALINNE.